United States Patent [19]

Smith

[11] Patent Number: 4,909,181
[45] Date of Patent: Mar. 20, 1990

[54] FLUID DISTRIBUTION BAR

[75] Inventor: Peter A. Smith, Kingsbridge, England

[73] Assignee: W. Wrigley Jr. Company, Chicago, Ill.

[21] Appl. No.: 259,061

[22] Filed: Oct. 18, 1988

[51] Int. Cl.$^4$ ............................. B05B 3/02; B05C 3/09
[52] U.S. Cl. ..................................... 118/679; 118/684; 118/302; 118/304; 118/315; 118/313; 118/418; 239/562; 239/581.1
[58] Field of Search ............................. 239/562, 581.1; 118/663, 679, 684, 300, 302, 313, 315, 304, 417, 418

[56] References Cited

U.S. PATENT DOCUMENTS

| | | | |
|---|---|---|---|
| T927,005 | 7/1973 | Blouin | 427/212 |
| 1,174,897 | 3/1916 | Preston | 137/625.31 |
| 1,186,226 | 6/1916 | Parker | 239/533,1 |
| 3,334,820 | 8/1967 | Flynn | 239/556 |
| 3,390,648 | 7/1968 | Martin | 427/3 |
| 3,451,375 | 6/1969 | Martin | 118/19 |
| 3,574,338 | 4/1971 | Shelor | 239/562 |
| 3,952,925 | 4/1976 | Babunovic et al. | 222/485 |
| 4,168,919 | 9/1979 | Rosen et al. | 366/173 |
| 4,334,493 | 6/1982 | Okawara | 118/19 |
| 4,576,108 | 3/1986 | Socola et al. | 118/19 |
| 4,690,639 | 9/1987 | Voorheis | 239/562 |
| 4,747,541 | 5/1988 | Morine et al. | 239/562 |

Primary Examiner—Willard Hoag
Attorney, Agent, or Firm—Willian Brinks Olds Hofer Gilson & Lione

[57] ABSTRACT

A fluid distribution bar, such as for applying a liquid or other fluent medium to a tumbling bed of material to be coated, has concentrically mounted inner and outer tubes in the described embodiment. The inner tube has a plurality of outlets along a length of the tube which are alignable with corresponding openings formed in the outer tube by relative movement of the tubes. A plurality of slidable seals each corresponding to an inner tube outlet are mounted in the interior of the outer tube to overlie and seal the inner tube outlets in a first position, with the relative movement of the tubes unsealing the outlets in a second position for fluid distribution. The described embodiment uses seals comprising an elongated flexible resilient sealing strip mounted at each end in apertures formed in the outer tube such that the flexible strips are elastically deformed to slidably bear against the exterior surface of the inner tube for a good sealing engagement.

24 Claims, 2 Drawing Sheets

FLUID DISTRIBUTION BAR

FIELD OF THE INVENTION

The invention generally relates to an apparatus for distributing, as by spraying, a fluid medium, and more particularly relates to an apparatus for applying a liquid or other fluent medium to a tumbling bed of material to be coated.

BACKGROUND OF THE INVENTION

The present invention has found particular application as a liquid distribution bar suitable for use for horizontal- or inclined-axis coating pans, tumbler drums and the like. For instance, such a tumbler drum typically would be an open-ended cylindrical rotatable drum which can be set at an angle to the horizontal so that the material fed into the upper end of the drum would move by gravity toward the lower end of the drum, tumbling on itself while the drum is rotated.

A pipe or similar distribution device is extended inside the drum above the level of material to be coated, and delivers a fluid, such as a liquid coating medium, or other fluent medium. The coating medium may be pumped or gravity fed to the distribution device, where it is then dispersed over the tumbling bed of material that is to be coated. For example, the liquid to be distributed may be a syrup that will solidify to form a coating on pillow-shaped gum pellets. In this particular application of the invention, the coating process involves tumbling chewing gum pellets inside of a horizontal-axis coating pan or tumbler drum, and coating the pellets with liquid syrup. After the pellets have been tumbled in the dispersed syrup, warm air is applied to dry the syrup and leave a thin coating of white sugar on the surface of the pellets. Many coatings of syrup are required during the approximately 4½ hour process.

A principal component in the foregoing coating process is the spray or distribution bar which applies the sugar coating to the outside of the pellets. A number of problems with existing spray or distribution bar equipment have been noted. The main problems encountered are frequent stoppages to replace stretched and split nozzles typically used with one kind of prior art spray bar, and uneven distribution of the syrup and splash-back of syrup onto the air box and other internal parts of the coating equipment. Over a period of days, this splash-back coating can rapidly build up on the equipment, restricting the flow of dry air onto the product from the air box, or causing other problems with the control of the overall process.

Valuable production time can be lost when the machine is stopped to remove encrusted syrup from the inside of the air box and tumbler drum. There is also a fairly high cost associated with purchasing and replacing the stretched and split flexible nozzles. Splitting and loss of elasticity and resilience in such nozzles may occur within a matter of weeks, resulting in very poor distribution, dripping and loss of product quality.

SUMMARY OF THE INVENTION

A principal objective of the present invention is to provide an improved fluid distribution bar which avoids the difficulties associated with prior art distribution bars, especially those using spray nozzles. A more particular and associated objective is to provide an apparatus for applying a liquid, or other fluid medium at a controlled and consistent rate over the full length of a tumbling bed of material to be coated utilizing the improved fluid distribution bar.

To these and other ends, the present invention comprises in its broadest form a fluid distribution bar having an elongated conduit adapted for carrying the fluid which is to be distributed. A plurality of fluid outlets are arranged along a length of the conduit, as in a line along one side. A like plurality of slidable seals overly and seal respective conduit outlets when the conduit and seals are in a first position. The seals are carried on a mount, and some means is provided for moving the conduit and seal mount relative to one another to a second position. In the second position, the conduit outlets are unsealed by the movement, and fluid provided to the conduit can then flow freely through the conduit outlets.

More specifically, the invention has found present form as a liquid distribution bar having an elongated inner tube adapted for carrying liquid to be distributed. The inner tube is set inside an outer tube, with the two tubes generally concentric. The outer tube surrounds the inner tube at least along the length of the inner tube having the outlets or openings therethrough. The outer tube has a like plurality of openings extending through its side which are alignable with the inner tube outlets.

A like plurality of slidable seals are mounted in the interior of the outer tube to overlie and seal the inner tube outlets when the two tubes are in a first position. In a present embodiment, the outlets of the inner tube are flush with an inner tube outer surface, e.g., a series of spaced circular through-bores in the inner tube. Round holes are considered particularly advantageous for the outlets or openings of the inner tube. The round holes can be replaced by slots along the length of the inner tube, however, although this is considered less advantageous.

Each of the seals comprises an elongated flexible and resilient sealing strip. The ends of each sealing strip are captured within paired apertures formed in the outer tube. The pairs of apertures for each sealing strip are located on the outer tube such that an imaginary line extending between a respective pair of apertures passes through the inner tube. This ensures that a sealing strip mounted in a respective pair of apertures is elastically deformed around a portion of the inner tube to slide along the inner tube outer surface. In the first position of the tubes, the outlets of the inner tube are somewhere along the midpoint of the flexible seal, and thereby sealed off.

In the foregoing embodiment, the inner tube is supported along one side within the outer tube by the mounted resilient sealing strips which are arranged to extend along one side of the inner tube. A second plurality of similarly mounted resilient strip members are arranged to extend along another, e.g. opposite, side of the inner tube, such that the inner tube is thereby cradled between the two opposed pluralities of resilient strips.

The movement to unseal the outlets of the inner tube can either be a longitudinal movement of the tubes of the foregoing embodiment, or preferably a rotary movement of the tubes, or some combination thereof. A presently preferred method of movement is to fix the outer tube and provide a means for driving the inner tube in a rotary manner relative to the outer tube. For example, the inner tube can be rotated through 90 degrees to unseal its outlets from the sealing strips, and align them with respective openings in the outer tube for fluid distribution in the second position. An equivalent result can be achieved, of course, by fixing the inner tube and rotating the outer tube.

Another feature of the present invention is a wash-out tube which is adapted to be fit over the foregoing liquid distribution bar. The wash-out tube is used for cleaning the liquid distribution bar. It has a tubular body with a length at least as long as the liquid distribution bar, and an internal diameter slightly greater than the outer diameter of the outer tube. The wash-out tube slides over the liquid distribution bar, with a small annular gap remaining between the wash-out tube and the outer tube. A cleaning fluid, such as hot water, is pumped through the wash-out tube to clean the enclosed liquid distribution bar at the end of a production run. The small annular gap between the wash-out tube and the outer tube creates sufficient turbulence for thorough washing.

In its present application as a liquid distribution bar for applying a coating of syrup to a bed of tumbling chewing gum pellets inside of a tumbler drum, the inventive liquid distribution bar has been found to evenly distribute the syrup across the entire drum so the syrup is delivered essentially equally upon the surface of the pellets. This ensures that the product is more consistent in size throughout the batch, and in turn reduces the scrap. Syrup yield is also maximized, and cleaning time is minimized for an overall machine efficiency improvement. The high cost of replacement nozzles has been completely eliminated. The liquid distribution bar of the present invention furthermore requires far less maintenance than nozzle-type appliances of the prior art.

Although the present invention has found particular application in the area of applying a coating to pellets of chewing gum, it is considered that the confectionary industry in general could benefit from this invention, especially where chewable or edible materials are to be coated with liquids. The pharmaceutical industry may also find the present invention applicable to the coating of pills and tablets, as may the seed industry for coating of seeds, pods, bulbs and tee like.

Departing from the area of applying coatings, the present invention can also conceivably be adapted for filling of a plurality of cans, bottles, containers or the like. In such an application, however, consideration should be given to dynamic frictional losses which would occur due to viscous drag on the walls of the inner tube or conduit, which might result in a pressure gradient within the tube or conduit producing an unequal distribution over the length of the bar. Adaptation of the invention as a filling device is nonetheless considered to be well within the skill of the art.

The foregoing objectives, features and other advantages of the invention will be further understood upon consideration of the following detailed description of an embodiment of the invention, taken in conjunction with the accompanying drawings, wherein:

DETAILED DESCRIPTION OF AN EMBODIMENT OF THE INVENTION

The following detailed description of a presently preferred embodiment of the invention is in the environment of an apparatus for coating chewing gum pellets in a tumbler drum. It will be understood that the invention is considered to have a broader application than in this particular environment, as mentioned in the foregoing Summary of the Invention.

Figure 1:
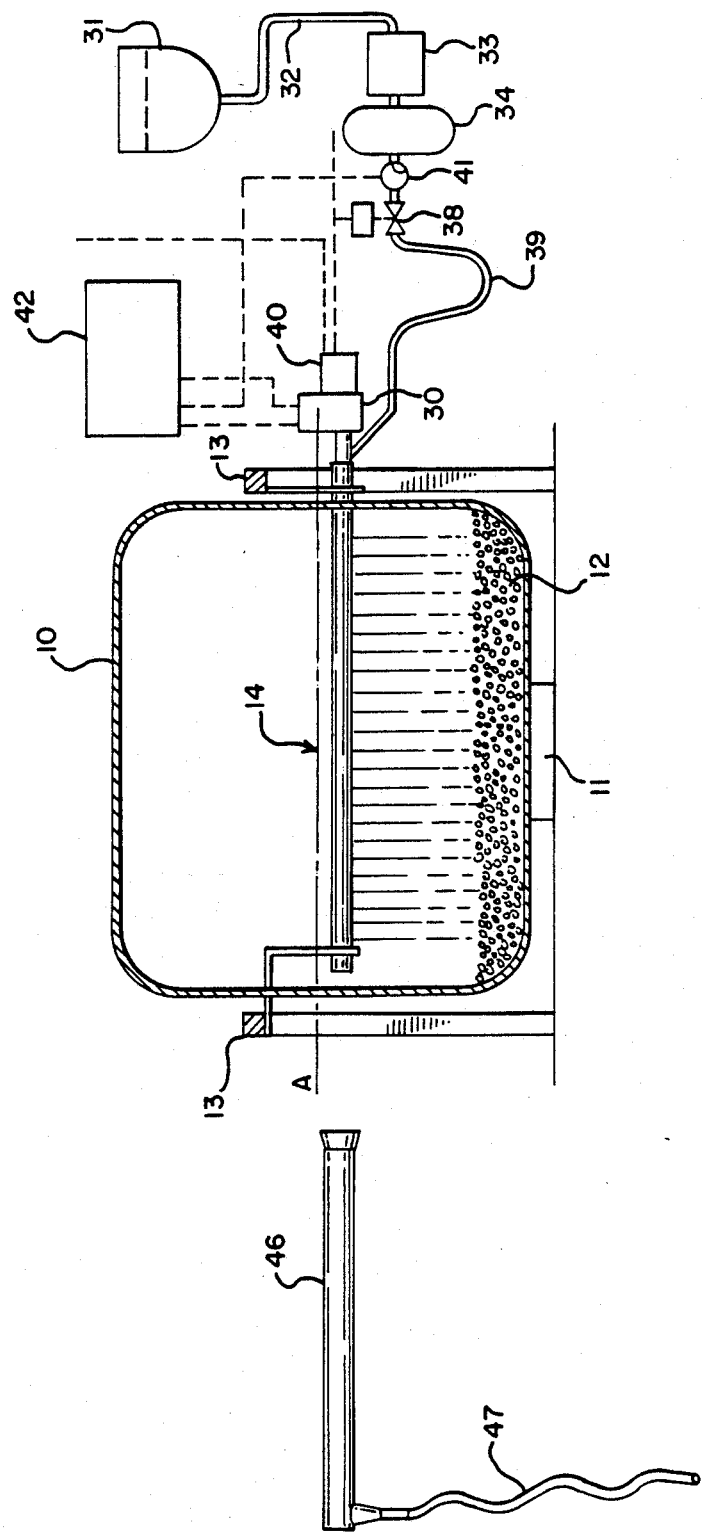
FIG. 1 is an elevational view, with portions broken away and other portions shown schematically, of a coating apparatus made in accordance with the teachings of the present invention.

With reference to FIG. 1, a tumbler drum 10 is mounted for rotation about its horizontal axis upon a commonly employed means for rotating the drum 10, as indicated schematically at 11. Material to be coated is indicated at 12, and in this application of the invention, comprises pelletized pillows of chewing gum. A frame is generally indicated at 13, and is adapted to support various components of the coating apparatus.

Extending within the tumbler drum 10 is a liquid distribution bar 14. The distribution bar 14 generally spans the coating area of the tumbler drum 10, and is supported by the frame 13. The distribution bar 14 is positioned so that it is generally parallel to the axis of rotation A of the tumbler drum 10, and above the product 12 to be coated.

Figure 2:
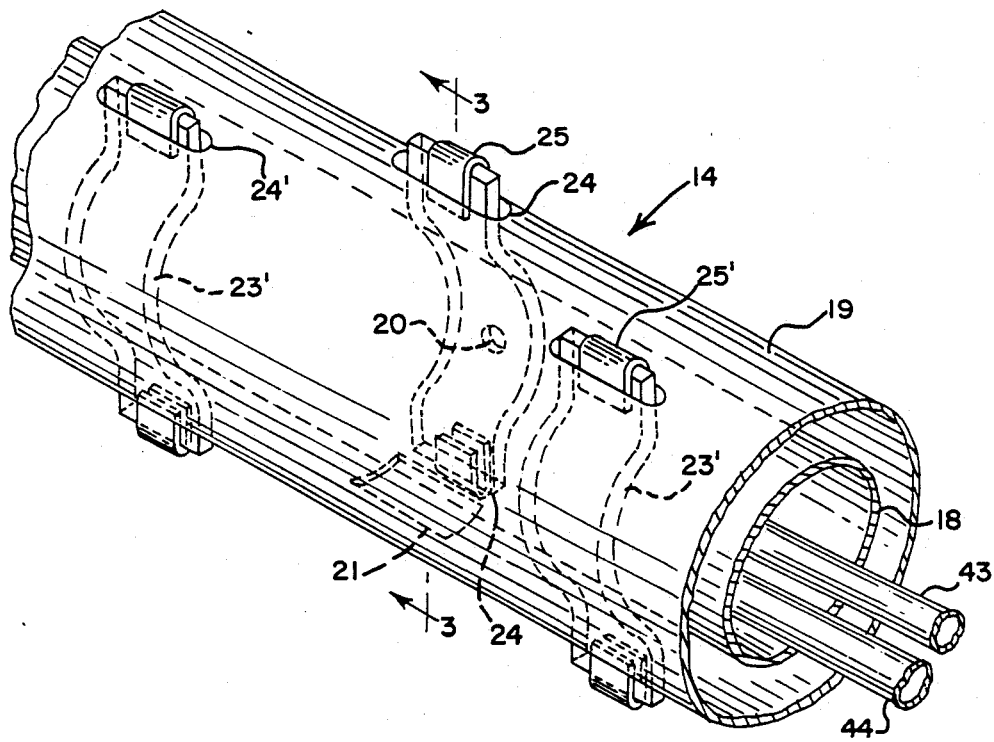
FIG. 2 is an enlarged elevational view, with portions broken away, of a liquid distribution bar of the type shown used with the apparatus of FIG. 1.
Figure 3:
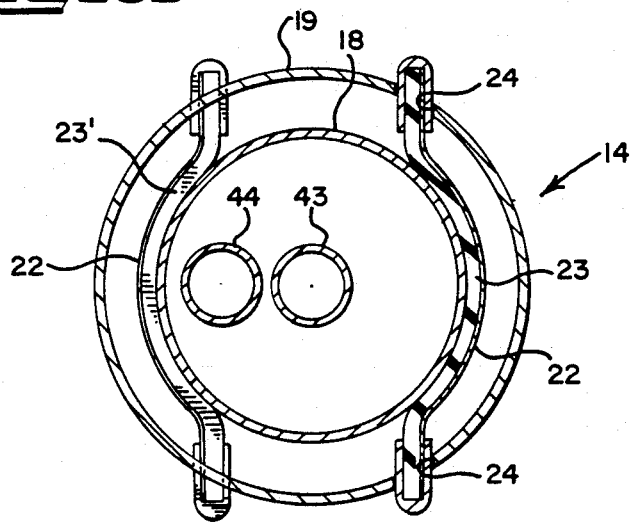
FIG. 3 is a sectional view taken along line 3—3 of FIG. 2.

With reference to FIGS. 2 and 3, the liquid distribution bar 14 comprises an inner tube 18 and an outer tube 19. The outer tube 19 is mounted concentric with the inner tube 18. In this embodiment of the invention, the outer tube 19 is fixed or stationary relative to the inner tube 18, as by fixing the outer tube to the frame 13. As will be described in further detail hereafter, the inner tube 18 is mounted to rotate relative to the outer tube 19.

What would constitute the far end—the end to the left in FIG. 1—of the inner tube 18 is closed. The outer tube 19 may be open or closed, although an open far end for the outer tube is preferred for purposes of cleaning.

A plurality of outlets or openings 20 are formed in a line which extends along a length of the inner tube 18. The openings 20 are preferably regularly spaced in a straight line along the length of the inner tube 18. The outer tube 19 has a like plurality of outer tube openings 21, which here take the form of elongated somewhat rectangular openings formed in the outer tube sidewall. The inner tube outlets 20 and outer tube openings 21 are alignable through rotary movement of the inner tube 18.

Overlying each of the inner tube outlets 20 in a first and sealed position are a plurality of flexible resilient sealing strip or strip seals 23. PTFE material has been found particularly advantageous for the strip seals 23 of the illustrated embodiment. The strip seal 23 have two ends and a midportion, with the midportion generally overlying the inner tube outlets 20 when sealing the same. The PTFE strips 23 are supported by thin backing strips 22 of stainless steel spring steel.

Apertures 24 are formed in the outer tube 19 in pairs which correspond to each strip seal 23. The apertures 24 are sized to receive the strip seal ends therein, including austenitic stainless steel spring steel clips 25 inserted on the strip seal ends. The apertures 24 are adapted to receive the clipped ends of the strip seals 23 in a secure grip when the ends are force-fit within the apertures 24.

The pairs of apertures 24 are located in the outer tube 19 such that an imaginary line extending between a respective pair of apertures 24 passes through the concentrically mounted inner tube 18. Thus, each strip seal 23 is forced to deform elastically so that it conforms to a portion of the outside surface of the inner tube 18, thereby firmly slidably gripping the inner tube outside surface for a sure seal over the outlets 20. The strip seals 23 also serve to wipe the outlets 20 in the course of rotation.

A second set or plurality of flexible resilient strips 23' of the same strip material used for the strip seals 23 is mounted in spaced relation generally along the opposite side of the outer tube 19 from the side with the strip seals 23. These resilient strip members 23' are received in pairs of apertures 24' using clips 25' in an identical manner as described in regard to the sealing strip seals 23. Elements 23', 24', and 25' are, in fact, identical to their strip seal counterparts.

This arrangement of mounted strip seals 23 and strip members 23' serves to carry the inner tube 18 in a cradled floating arrangement within the outer tube 19. The inner tube 18 may be supported in other manners, but this floating arrangement is considered to be particularly advantageous.

A pneumatic rotary actuator 30 is connected to the inner tube 18. Such a rotary actuator can be a Kinetrol ¼ turn pneumatic actuator. When the rotary actuator 30 is engaged, it rotates the inner tube 18 through 90 degrees (clockwise as viewed in FIG. 3). The rotation unseals the inner tube outlets 20 from the strip seals 23, and aligns the inner tube outlets 20 with the outer tube openings 21. Liquid is now able to freely flow from the inner tube 18 through the outer tube 19 for distribution.

Liquid is supplied from a fluid reservoir 31 through piping 32 to a filter 33 through the action of a pump 34. A discharge valve 38 operates in conjunction with the pump 34 for flow of liquid into a feed line 39 which communicates with the interior of the inner tube 18.

The various elements of the liquid feed system as well as the rotary actuator 30 are controlled by a microcontrol unit 42 which coordinates fluid flow with alignment of the inner and outer tube openings 20, 21. For example, a microcontrol unit 42 sends a signal to the liquid distribution bar rotary actuator 30 to rotate the inner tube 18 to the "open" position. Once fully rotated, a micro-switch 40 is tripped allowing pump 34 to start and discharge valve 38 to open. Syrup from the reservoir 31 then flows through the filter 33 into the pump 34. A meter 41 in the fluid flow rotates to register the flow of liquid, and pulses from the meter 41 are accumulated in the microcontrol unit 42. Once a pre-set number of pulses have accumulated, discharge valve 38 closes and pump 34 is deactivated. After a further delay of approximately three seconds, a signal is sent from the microcontrol unit 42 to the rotary actuator 30 to rotate the inner tube 18 counter-clockwise through 90° to a sealed or "closed" position.

This mode of operation has been found to work well with a 68 brix plain and starch syrup at approximately 90° C. It may be noted that rotating the inner tube 18 fully before startup of the fluid delivery avoids syrup being squirted out through the inner tube outlets 20 before alignment with the outer tube openings 21. The delay at the end of the distribution cycle of approximately three seconds is to allow residual pressure to fall to ambient pressure so that the strip seals 23 do not have to close against pressure.

Experiments conducted with a prototype of the invention show that a startup syrup at 90° C. 70 brix at a flow rate of approximately 350 gallons/hour at a pressure of 2 bar resulted in an even distribution of syrup across a 10' long distribution bar (14) with 41 equally spaced inner tube/outer tube openings each having a diameter of approximately 1/6 of an inch.

As shown in FIGS. 2 and 3, piping can additionally be provided in the interior of the inner tube 18 to carry hot water, for example, for maintaining the temperature of the syrup during distribution. Pipe 43 carries the hot water into the inner tube 18, and pipe 44 continues the hot water loop, carrying the water out of the inner tube 18.

The inner tube 18 is well protected from the fierce drying environment typically used in the tumbler drum 10. Any syrup that may be splashed back on the liquid distribution bar 14 or inside of the outer tube 19 doe not tend to dry during the period of the normal 16 hour shift. At the end of the shift, the liquid distribution bar can be cleaned by inserting a wash-out tube 46 over the full length of the liquid distribution bar 14. The wash-out tube 44 is slightly largre than the outer diameter of the outer tube 21, including the outboard extending portions of the strips 23 and 23'. A cleaning fluid, such as hot water, is supplied to the interior of the wash-out tube 46 via appropriate piping or hose 47 to purge any residual syrup from the liquid distribution bar. The small annular gap between the wash-out tube and the exterior surface of the outer tube 19 has been found to create sufficient turbulence for effective washing and cleaning.

Thus, while the invention has been described in relation to a particular embodiment, those having skill in the art will recognize modifications of materials, structure and the like which will still fall within the scope of the present invention.

What is claimed is:

1. A fluid distribution bar comprising:
   an elongated inner tube adapted for carrying fluid to be distributed and having a plurality of openings therethrough along the length of said inner tube,
   an outer tube surrounding and generally concentric with said inner tube at least along said inner tube length, said outer tube having a like plurality of openings therethrough which are alignable with said inner tube openings,
   a like plurality of slidable seals mounted in the interior of said outer tube to overlie and seal said inner tube openings in a first position of said inner and outer tubes, and
   means for moving one of said inner and outer tubes to a second position with said openings of said inner tube unsealed by said movement and said openings of said inner and outer tubes aligned for fluid flow from said inner tube openings through corresponding outer tube openings.

2. The fluid distribution bar of claim 1 wherein one of said inner and outer tubes is fixed in place, and the other of said inner and outer tubes is rotated about its axis by rotary drive means which comprises said means for moving, said inner tube openings being flush with an inner tube outer surface, each of said seals comprising an elongated flexible resilient sealing strip having two ends and a midportion, said outer tube having pairs of apertures formed therein into which respective ends of each sealing strip extend and are captured, said pairs of apertures being located on said outer tube such that an imaginary line extending between a respective pair of apertures passes through said inner tube, whereby a sealing strip mounted in a respective pair of apertures is elastically deformed by said inner tube to bear against and slide along said inner tube outer surface along said sealing strip midportion.

3. The fluid distribution bar of claim 2 wherein said outer tube is fixed in place, said inner tube being supported within said outer tube by said sealing strips mounted in spaced relation along one side of said inner tube, and a second plurality of similarly mounted flexible resilient strip members arranged along another side of said inner tube which is generally opposite to said one side, said inner tube thereby being cradled by said two oppose pluralities of sealing strips and strip members.

4. The fluid distribution bar of claim 3 further including a wash-out tube for cleaning said fluid distribution bar, said wash-out tube having a tube body with a length at least as long as said distribution bar and an internal diameter slightly greater than a maximum outer diameter of said outer tube to permit said wash-out tube to enclose said distribution bar with a small annular gap remaining between said wash-out and said outer tube, and means for supplying a cleaning fluid to the interior of said wash-out tube.

5. A fluid distribution bar comprising:
an elongated conduit adapted for carrying liquid to be distributed having a plurality of fluid outlets along a length of said conduit,
a like plurality of slidable seals overlying and sealing respective conduit outlets in a first position,
a seal mount, and
means for moving said conduit and seal mount relative to one another to a second position with said conduit outlets unsealed by said movement.

6. The fluid distribution bar of claim 5 wherein said means for moving comprises a rotary drive means for rotating one of said conduit and seal mount relative to the other of said conduit and seal mount.

7. The fluid distribution bar of claim 5 wherein said conduit is an inner tube, said seal mount comprising an outer tube surrounding and generally concentric with said inner tube at least along said length, said outer tube having a like plurality of openings therethrough which are alignable with said outlets in said second position, said slidable seals mounted in said interior of said outer tube to overlie and seal said outlets in said first position, said means for moving causing one of said inner and outer tubes to move to a second position with said outlets unsealed by said movement and said openings aligned with said outlets for fluid flow from said outlets through corresponding outer tube openings.

8. The fluid distribution bar of claim 7 wherein said means for moving comprises a rotary drive means for rotating one of said inner tube and outer tube relative to the other of said inner tube and outer tube.

9. The fluid distribution bar of claim 7 wherein said outlets are flush with an inner tube tube outer surface and said seals each comprise an elongated flexible and resilient sealing strip members having two ends and a midportion, said outer tube having pairs of apertures formed therein into which respective ends of each sealing strip extend and are captured, said pairs of apertures being located on said outer tube such that an imaginary line extending between a respective pair of apertures passes through said inner tube, whereby a sealing strip member mounted in a respective pair of apertures is elastically deformed by said inner tube to bear against and slide along said inner tube outer surface along said sealing strip midportion.

10. The fluid distribution bar of claim 9 wherein said inner tube is supported by said resilient sealing strip members arranged along one side of said inner tube, and a second plurality of similarly mounted elongated flexible and resilient strip members arranged to extend along another side of said inner tube which is generally opposite to said one side, said inner tube thereby being cradled by said two opposed pluralities of resilient strip members.

11. The fluid distribution bar of claim 9 wherein said means for moving comprises a rotary drive means for rotating one of said inner tube and outer tube relative to the other of said inner tube and outer tube.

12. The fluid distribution bar of claim 11 wherein said outer tube is fixed in place and said inner tube is rotated by said rotary drive means to slidably rotate said outlets away from said sealing strip members to an unsealed condition in said second position with said outlets and openings aligned.

13. The fluid distribution bar of claim 7 wherein said outlets are flush with an inner tube outer surface and said seals each comprise a resilient sealing member mounted in said outer tube to bear against and slide along said inner tube outer surface to overlie and seal said outlets in said first position.

14. The fluid distribution bar of claim 13 further including a wash-out tube for cleaning said fluid distribution bar, said waste-out tube having a tube body with a length at least as long as said distribution bar and an internal diameter slightly greater than a maximum outer diameter of said outer tube to permit said wash-out tube to enclose said distribution bar with a small annular gap remaining between said wash-out and said outer tube, and means for supplying a cleaning fluid to the interior of said wash-out tube.

15. The fluid distribution bar of claim 13 wherein said resilient sealing members are elongated resilient strip members, and said inner tube is supported within said outer tube by said sealing strip members mounted to extend in spaced relation along one side of said inner tube, and a second plurality of similarly mounted strip members arranged in spaced relation along another side of said inner tube which is generally opposite to said one side, said inner tube thereby being cradled by said two opposed pluralities of strip members.

16. The fluid distribution bar of claim 15 wherein clips are provided on each strip member end of both pluralities of strip members, said apertures being elongated slots through said outer tube and said clips being U-shaped with a strip member end received in a clip, a clip when combined with said strip member end being wider than an aperture width to thereby clamp its strip end within said aperture when the combined clip and strip member end is force-fit within an aperture.

17. The fluid distribution bar of claim 13, wherein said means for moving comprises a rotary drive means for rotating one of said inner tube and outer tube relative to the other of said inner tube and outer tube.

18. The fluid distribution bar of claim 17 wherein said outer tube is stationary and said inner tube is rotated by said rotary drive means to slidably rotate said outlets away from said sealing members to an unsealed condition in said second position with said outlets and openings aligned.

19. An apparatus for applying a liquid, or other fluent medium, to a tumbling bed of material to be coated comprising:
a reservoir of the liquid to be applied as the coating, a tumbler drum, means to rotate said tumbler drum about its axis, a liquid distribution bar extending within said drum comprising:

an elongated inner tube adapted for carrying fluid to be distributed and having a plurality of openings therethrough along the length of said inner tube, said inner tube being closed at one end, an outer tube surrounding and generally concentric with said inner tube at least along said inner tube length, said outer tube having a like plurality of openings therethrough which are alignable with said inner tube openings, a like plurality of slidable seals mounted in the interior of said outer tube to overlie and seal said inner tube openings in a first position of said inner and outer tubes, and means for moving one of said inner and outer tubes to a second position with said openings of said inner tube unsealed by said movement and said openings of said inner and outer tubes aligned for fluid flow from said inner tube openings through corresponding outer tube openings, a base supporting said liquid distribution bar, and means for metering and delivering said liquid from said reservoir to said inner tube for distribution including a liquid pump, a flow control valve and a programmable controller to operate said valve, pump and means for moving.

20. The coating apparatus of claim 19 further including a wash-out tube for cleaning said fluid distribution bar, said wash-out tube having a tube body with a length at least as long as said distribution bar and an internal diameter slightly greater than a maximum outer diameter of said outer tube to permit said wash-out tube to enclose said distribution bar with a small annular gap remaining between said wash-out and said outer tube, and means for supplying a cleaning fluid to the interior of said wash-out tube.

21. The coating apparatus of claim 19 wherein one of said inner and outer tubes is fixed in place, and the other of said inner and outer tubes is rotated about its axis by rotating drive means which comprises said means for moving, said inner tube openings being flush with an inner tube outer surface, each of said seals comprising an elongated flexible resilient sealing strip having two ends and a midportion, said outer tube having pairs of apertures formed therein through which respective ends of each sealing strip extends and is captured, said pairs of apertures being located on said outer tube such that an imaginary line extending between a respective pair of apertures passes through said inner tube, whereby a sealing strip mounted in a respective pair of apertures is elastically deformed by said inner tube to bear against and slide along said inner tube outer surface along said sealing strip midportion.

22. The coating apparatus of claim 21 wherein said outer tube is fixed in place, said inner tube being supported within said outer tube by said mounted sealing strips arranged along one side of said inner tube, and a second plurality of similarly mounted resilient strip members arranged to extend along another side of said inner tube which is generally opposite to said one side, said inner tube thereby being cradled by said two opposed pluralities of sealing strips and strip members.

23. A liquid distribution bar for applying a viscous liquid to a tumbling bed of material to be coated comprising:

an elongated inner tube adapted for carrying liquid to be distributed and having a plurality of outlets therethrough along the length of said inner tube, said outlets of said inner tube being flush with an inner tube outer surface, an outer tube surrounding and generally concentric with said inner tube at least along said length, said outer tube having a like plurality of openings therethrough which are alignable with said outlets in a second position, a like plurality of resilient slidable seals mounted in the interior of said outer tube to bear against and slide along said outer surface to overlie and seal said outlets in a first position, and means for moving one of said inner and outer tubes to a second position with said outlets of said inner tube unsealed by said movement and said openings of said inner and outer tubes aligned for liquid flow from said inner tube outlets through corresponding outer tube openings.

24. A liquid distribution bar for applying a viscous liquid to a tumbling bed of material to be coated in a tumbler drum comprising:

an elongated inner tube adapted for carrying fluid to be distributed and having a plurality of spaced outlets therethrough along the length of said inner tube, one end of said inner tube being closed, said outlets of said inner tube being flush with an inner tube outer surface, an outer tube surrounding and generally concentric with said inner tube at least along said length, said outer tube having a like plurality of spaced openings therethrough which are alignable with said outlets in a second position, a like plurality of slidable seals each comprising an elongated flexible and resilient sealing strip having two ends and a midportion, said outer tube having pairs of apertures formed therein through which a respective end of each sealing strip extends and is captured, said pairs of apertures being located on said outer tube such that an imaginary line extending between a respective pair of apertures passes through said inner tube whereby a sealing strip mounted in a respective pair of apertures is elastically deformed by said inner tube to bear against and slide along said inner tube outer surface along said sealing strip midportion, said inner tube being supported within said outer tube by said sealing strips arranged to extend along one side of said inner tube, and a second plurality of similarly mounted elongated flexible and resilient strips arranged to extend along another side of said inner tube which is generally opposite to said one side said inner tube thereby being cradled by said two opposed pluralities of strips, said outer tube being stationary, and rotary drive means for rotating said inner tube to slidably rotate said outlets away from said seals to an unsealed condition in said second position with said outlets and openings aligned.

* * * * *

UNITED STATES PATENT AND TRADEMARK OFFICE
CERTIFICATE OF CORRECTION

PATENT NO. : 4,909,181
DATED : March 20, 1990
INVENTOR(S) : Peter A. Smith

It is certified that error appears in the above-identified patent and that said Letters Patent is hereby corrected as shown below:

On the cover page under the heading "Assignee", before "Wrigley" please delete "W." and substitute therefor --Wm.--.

In column 2, line 8, please delete "overly" and substitute therefor --overlie--.

In column 3, line 41, please delete "tee" and substitute therefor --the--.

In column 4, line 52, please delete "seal" and substitute therefor --seals--.

In column 6, line 2, please delete "1/6" and substitute therefor --1/16--.

In column 6, line 13, please delete "doe" and substitute therefor --does--.

In column 6, line 18, please delete "largre" and substitute therefor --larger--.

UNITED STATES PATENT AND TRADEMARK OFFICE
CERTIFICATE OF CORRECTION

PATENT NO. : 4,909,181
DATED : March 20, 1990
INVENTOR(S) : Peter A. Smith

It is certified that error appears in the above-identified patent and that said Letters Patent is hereby corrected as shown below:

<u>IN THE CLAIMS</u>

Col. 7, claim 3, line 9, please delete "oppose" and substitute therefor --opposed--.

claim 7, line 7, before "interior" please delete "said" and substitute therefor --the--.

claim 9, line 2, please delete the second occurrence of "tube".

Col. 8, claim 10, line 6, after "another" please delete "said" and substitute therefor --side--.

claim 14, line 3, please delete "waste-out" and substitute therefor --wash-out--.

Col. 9, claim 21, line 4, please delete "rotating" and substitute therefor --rotary--; in line 10, delete "extends" and substitute therefor --extend--, and delete "is" and substitute therefor --are--.

UNITED STATES PATENT AND TRADEMARK OFFICE
CERTIFICATE OF CORRECTION

PATENT NO. : 4,909,181
DATED : March 20, 1990
INVENTOR(S) : Peter A. Smith

Page 3 of 3

It is certified that error appears in the above-identified patent and that said Letters Patent is hereby corrected as shown below:

Col. 10, claim 24, 35, after "side" please insert --,--.

Signed and Sealed this

Sixth Day of April, 1993

*Attest:*

STEPHEN G. KUNIN

*Attesting Officer*    Acting Commissioner of Patents and Trademarks